United States Patent
Błachut et al.

(10) Patent No.: US 12,486,878 B2
(45) Date of Patent: Dec. 2, 2025

(54) ROTOR CLIP FOR BRAKE ASSEMBLY

(71) Applicant: GOODRICH CORPORATION, Charlotte, NC (US)

(72) Inventors: Aleksander Andrzej Błachut, Ozimek (PL); Mirosław Stanisław Sosnowski, Mirków (PL)

(73) Assignee: GOODRICH CORPORATION, Charlotte, NC (US)

( * ) Notice: Subject to any disclaimer, the term of this patent is extended or adjusted under 35 U.S.C. 154(b) by 377 days.

(21) Appl. No.: 18/330,215

(22) Filed: Jun. 6, 2023

(65) Prior Publication Data
US 2023/0407934 A1  Dec. 21, 2023

(30) Foreign Application Priority Data
Jun. 13, 2022  (EP) ..................................... 22461572

(51) Int. Cl.
*F16D 65/12* (2006.01)
*F16D 65/02* (2006.01)

(52) U.S. Cl.
CPC ......... *F16D 65/123* (2013.01); *F16D 65/126* (2013.01); *F16D 2065/1372* (2013.01); *F16D 2065/1392* (2013.01)

(58) Field of Classification Search
CPC ...... F16D 65/123; F16D 65/126; F16D 55/36; F16D 65/12; F16D 65/0972; F16D 2065/1372; F16D 2065/1392; F16D 2065/1368
USPC .......................................................... 188/17
See application file for complete search history.

(56) References Cited

U.S. PATENT DOCUMENTS

| | | | | |
|---|---|---|---|---|
| 3,731,769 A | * | 5/1973 | Ely | F16D 65/121 188/218 XL |
| 3,757,907 A | * | 9/1973 | Crossman | F16D 65/126 188/218 XL |
| 3,800,392 A | * | 4/1974 | Cook | F16C 35/06 29/402.06 |

(Continued)

FOREIGN PATENT DOCUMENTS

| | | |
|---|---|---|
| EP | 3072610 | 9/2016 |
| GB | 2201475 | 9/1998 |
| NL | 7206989 | 11/1972 |

OTHER PUBLICATIONS

European Patent Office, European Search Reported dated Nov. 4, 2022 in Application No. 22461572.4.
(Continued)

*Primary Examiner* — Henry Y Liu
(74) *Attorney, Agent, or Firm* — SNELL & WILMER L.L.P.

(57) ABSTRACT

A clip for a rotor disk of a brake assembly, the clip arranged to fit over an end of a lug of the rotor disk, the clip having two opposing sides and an end portion across the two opposing sides, and a top portion, the top portion, the sides and the end portion each having an inner surface and an outer surface, and the inner surface of the top portion, the sides and the end portion together defining a receptacle to receive the rotor lug, in use, the clip having at least one aperture in each of the sides; the clip further comprising a reinforcement member extending from the inner surface of the end portion internal of the receptacle, between the two sides.

15 Claims, 3 Drawing Sheets

(56) References Cited

U.S. PATENT DOCUMENTS

| | | | | |
|---|---|---|---|---|
| 3,902,578 | A * | 9/1975 | Berger | F16D 65/126 188/218 XL |
| 3,907,076 | A * | 9/1975 | Crossman | F16D 65/126 188/218 XL |
| 3,927,740 | A * | 12/1975 | Zarembka | F16D 65/126 188/218 XL |
| 3,972,395 | A * | 8/1976 | Jannasch | F16D 69/023 188/218 XL |
| 4,007,814 | A * | 2/1977 | Berger | F16D 65/121 188/218 XL |
| 4,465,165 | A * | 8/1984 | Bok | F16D 65/126 188/218 XL |
| 4,469,204 | A * | 9/1984 | Bok | F16D 65/126 188/218 XL |
| 4,511,021 | A * | 4/1985 | Grider | F16D 65/126 188/218 XL |
| 4,557,356 | A * | 12/1985 | Petersen | F16D 65/126 188/218 XL |
| 4,747,473 | A * | 5/1988 | Bok | F16D 65/126 188/218 XL |
| 4,784,246 | A * | 11/1988 | Edmisten | F16D 65/126 188/218 XL |
| 4,863,001 | A * | 9/1989 | Edmisten | F16D 65/126 188/218 XL |
| 4,890,700 | A * | 1/1990 | Guichard | F16D 65/126 188/218 XL |
| 5,560,452 | A * | 10/1996 | Labougle | F16D 65/126 188/218 XL |
| 6,419,056 | B1 * | 7/2002 | Dyko | F16D 65/847 188/71.6 |
| 7,303,055 | B2 * | 12/2007 | Eckert | F16D 55/36 188/218 XL |
| 7,442,443 | B2 * | 10/2008 | Swank | C22C 38/02 188/251 A |
| 7,802,758 | B2 * | 9/2010 | Cress | F16D 65/126 188/73.2 |
| 8,418,817 | B2 * | 4/2013 | Visca | F16D 65/12 188/218 XL |
| 10,221,905 | B2 * | 3/2019 | Stevenson | F16D 65/126 |
| 10,436,265 | B2 * | 10/2019 | Stevenson | F16D 65/12 |
| 10,941,823 | B2 * | 3/2021 | Reed | F16D 55/36 |
| 11,746,844 | B2 * | 9/2023 | Blachut | B64C 25/36 301/6.2 |
| 11,913,510 | B2 * | 2/2024 | Whittle | F16D 65/0972 |
| 12,264,717 | B2 * | 4/2025 | Bonifas | F16D 65/126 |
| 2005/0230196 | A1 * | 10/2005 | Eckert | F16D 55/36 188/71.1 |
| 2006/0269766 | A1 * | 11/2006 | Swank | F16D 13/683 428/469 |
| 2007/0193836 | A1 * | 8/2007 | Walker | F16D 65/126 188/218 XL |
| 2013/0001029 | A1 * | 1/2013 | Visca | F16D 65/12 188/234 |
| 2018/0128331 | A1 * | 5/2018 | Stevenson | F16D 65/0978 |
| 2019/0048949 | A1 * | 2/2019 | Stevenson | F16D 65/123 |
| 2019/0162260 | A1 * | 5/2019 | Reed | F16D 55/24 |

OTHER PUBLICATIONS

English abstract not available for NL7206989 (US counterpart provided—U.S. Pat. No. 3757907).

* cited by examiner

ROTOR CLIP FOR BRAKE ASSEMBLY

CROSS-REFERENCE TO RELATED APPLICATIONS

This application claims priority to, and the benefit of, EP Patent Application No. 22461572.4, filed Jun. 13, 2022 and entitled "ROTOR CLIP FOR BRAKE ASSEMBLY," which is incorporated by reference herein in its entirety for all purposes.

FIELD

The present disclosure relates to a clip for the rotor of a brake assembly.

BACKGROUND

Braking assemblies for applying a braking force to a rotating body e.g. a wheel, are well known and typically comprise a brake stack of alternating rotor and stator disks. The braking assembly is actuated by applying a force to an actuator e.g. a piston which applies force to a pressure plate which compresses the rotor and stator disks of the brake stack together to cause deceleration and braking by friction. Typically, the rotor disks are provided with circumferential drive lugs via which the compressive force is applied to the rotor disks. Such braking mechanisms are well known and will not be described further in any detail. Brake assemblies operating in this way are common in aircraft and other vehicles. Where a high braking force is required, such as in aircraft, the rotor disks have to be made of a strong, heavy duty material such as a strong steel material or, more recently, carbon material. Carbon is preferred in many applications e.g. in aircraft, because it is more lightweight than steel for the same strength. Reduced weight of parts in or on aircraft allow for a reduction in fuel consumption and, in turn, reduced CO2. emissions. Because of the material used, the rotor disks are expensive parts. In order to prolong the life of these disks, rotor clips are typically provided on the outer circumference of the disk e.g. on the drive lugs to provide some protection against wear of the rotor disk material. The clips transfer the drive force to the rotor drive lug. These clips, when they become worn, can be easily and relatively inexpensively replaced, allowing the more expensive rotor disks to be reused and extending their life.

Various designs for rotor clips are known, these include a spring clip secured over the rotor drive lug by means of a rivet or similar fastener. Half cap clips are also known, which fit over just the end part of the drive lug. Floating clips are also known, which are positioned between drive lugs and allow for some movement of the clip during braking. Again, these clips are secured in position by means of rivets or pins or similar fasteners. Usually, two rivets are passed through aligned holes in the clip and the lug and are secured by rivet heads.

As high torques are transferred by the clip, the fasteners securing the clips in place are also subject to high forces acting perpendicular to the force to be transmitted to the clip and these rivets/pins are subject to bending or breakage due to these forces. Furthermore, such fasteners will have a head that protrudes beyond the surface of the clip which can also be damaged or can cause damage to other parts. The force on the fasteners and the forces exerted by the fasteners in known designs might not be equally distributed and hot spots can be created where the fasteners exert forces on the clip or the rotor, e.g. at the back of the rivet heads, thus causing damage to the clip and/or rotor disk. Rivets that can provide the required strength and security are expensive and difficult to manufacture and use. The use of these rivets also introduces the risk of damage to the rotor disk material when the clips are being replaced. To assemble the clip, several steps are required—the clip has to be placed over the rotor lug and the holes in the clip aligned with the holes through the lug, then two separate pins or rivets need to be passed through the holes and secured with a further head or nut.

There is a need for an improved clip that avoids or mitigates these problems.

SUMMARY

According to the disclosure, there is provided a clip for a rotor disk of a brake assembly, the clip arranged to fit over an end of a lug of the rotor disk, in use, the clip having two opposing sides and an end portion across the two opposing sides, and a top portion, the top portion, the sides and the end portion each having an inner surface and an outer surface and the inner surface of the top portion, the sides and the end portion together defining a receptacle to receive the rotor lug, the clip having at least one aperture in each of the sides; the clip further comprising a reinforcement member extending from the inner surface of the end portion internal of the receptacle, between the two sides.

Also provided is a method for assembling such a clip, as well as a rotor disk, a brake assembly and a wheel assembly having such a clip design.

BRIEF DESCRIPTION OF THE DRAWINGS

Examples of the clip according to the disclosure will now be described with reference to the drawings. It should be noted that other examples are possible within the scope of the claims.

DETAILED DESCRIPTION

Figure 1:
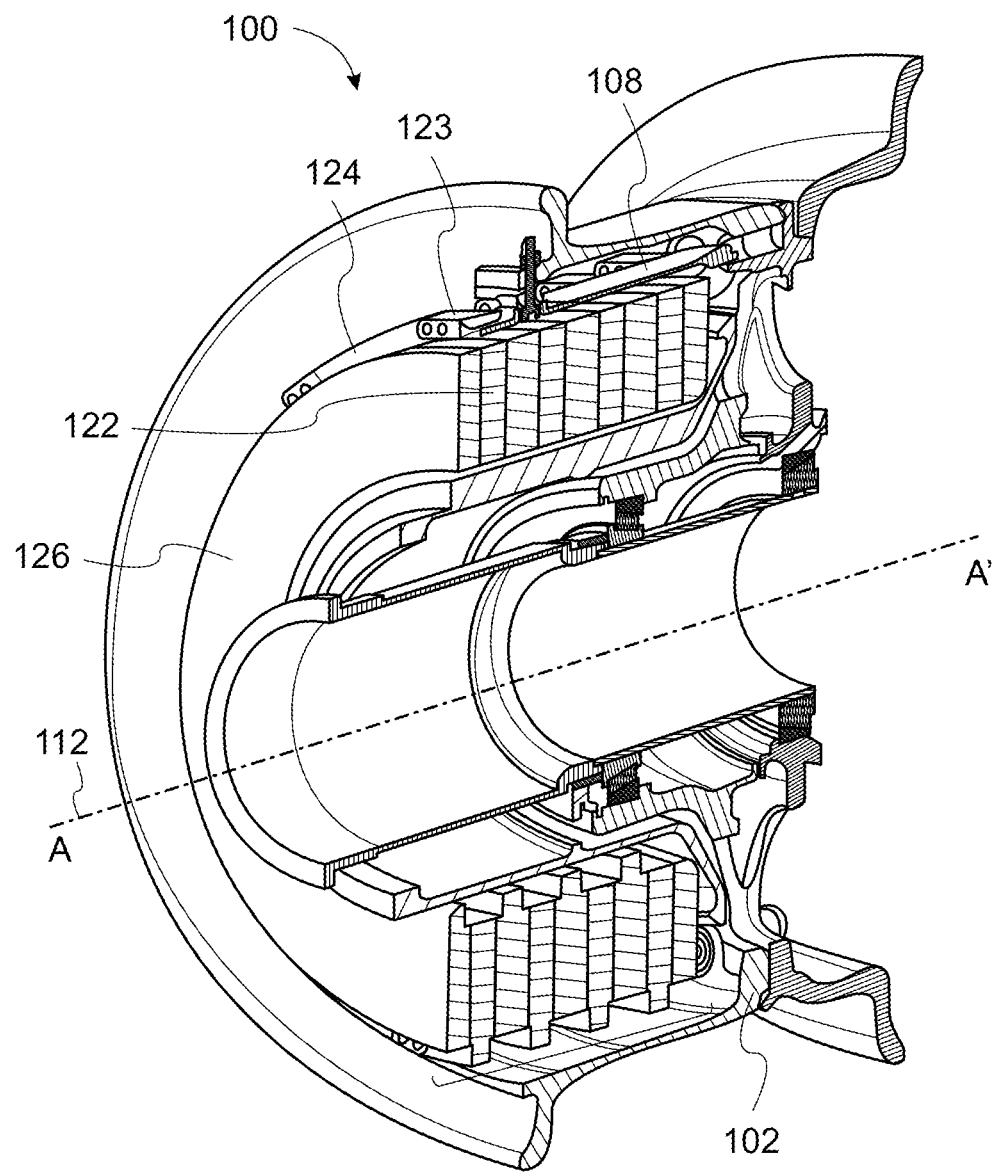
FIG. 1 is a perspective view of a section through a typical brake assembly.
Figure 2:
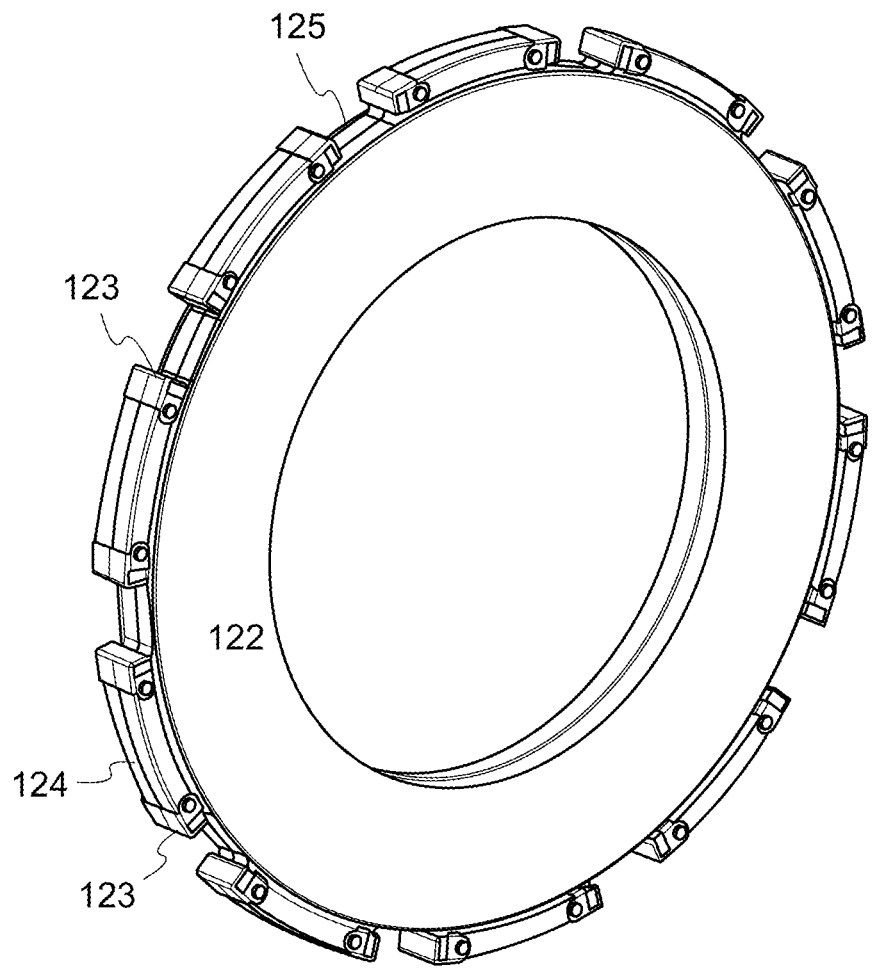
FIG. 2 is a simpler view of a rotor disk having lugs to which clips are attached.

Referring first to FIG. 1, a wheel brake assembly is shown for purposes of explanation. The brake assembly 100 is mounted within a wheel 102 which rotates about an axis A-A' 112. The brake assembly comprises a stack of alternate rotor disks 122 and stator disks 126 with the rotor disks rotatable with the wheel, and relative to the stator disks, about axis 112. To decelerate or brake rotation of the wheel pressure is applied by means of actuators in the axial direction A-A' to the brake stack to compress the rotor and stator disks together, causing friction between the rotor and stator disks and thus slowing the wheel. The rotor disks have rotor lugs 124 defined around their circumference and extending radially outwards with respect to the axis of rotation 112. Slots 125, shown in FIG. 2, are defined between adjacent lugs 124. Torque bars 108 acts as drive lugs that engage the wheel with the rotor disks via the rotor lugs.

As mentioned above, in order to protect the rotor disk material against wear, the rotor lugs 124 may be provided with protective clips 123 via which the torque is transferred from the torque bars 108 to the rotor lugs 124, and hence to the rotor disk. During use, the operation of the brake assembly will cause the brake clips 123 to wear before the rotor disk material wears, and the clips 123 can be removed and new clips fitted, without needing to replace the entire rotor disk.

The provision of clips on the rotor lugs can also been seem in the simpler view of FIG. 2 which shows a rotor disk 122 having lugs 124 provided around its circumference, with clips 123 attached to the ends of the rotor lugs.

Conventionally, these clips are attached to the rotor disks or rotor lugs by means of rivets that pass through the rotor lug from one side to the other. An example of such known clip designs is shown in FIG. 3.

Figure 3:
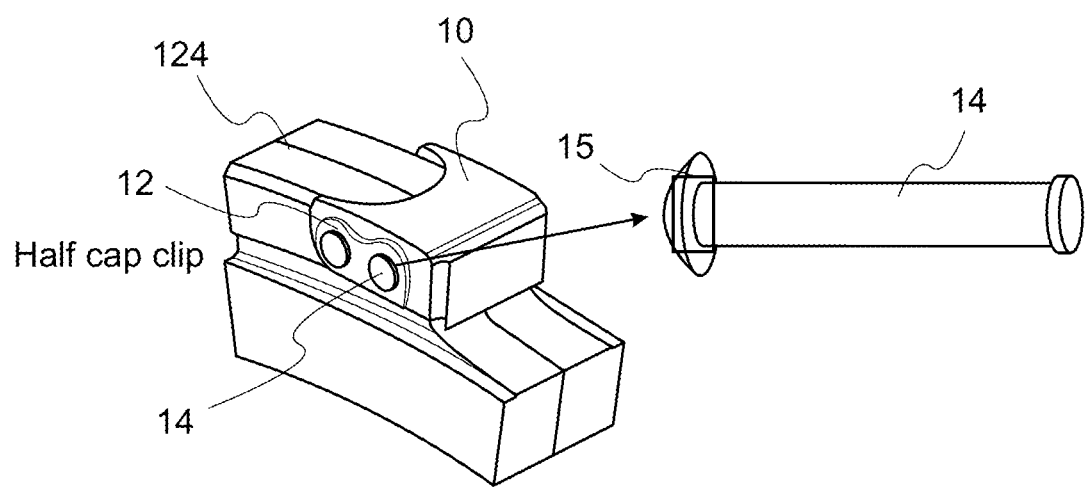
FIG. 3 shows a conventional clip with a rivet fastener.
Figure 4:
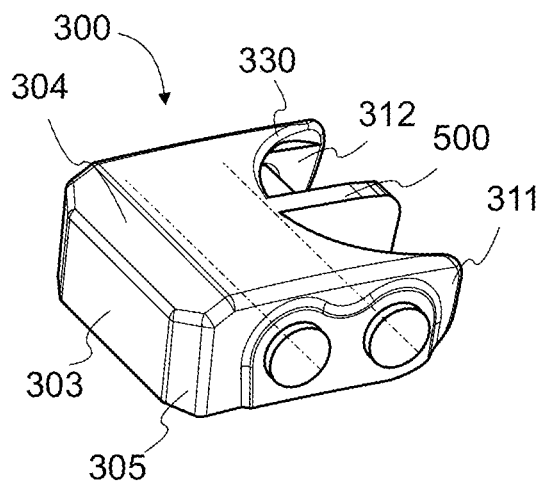
FIG. 4 shows a clip according to the disclosure.
Figure 5:
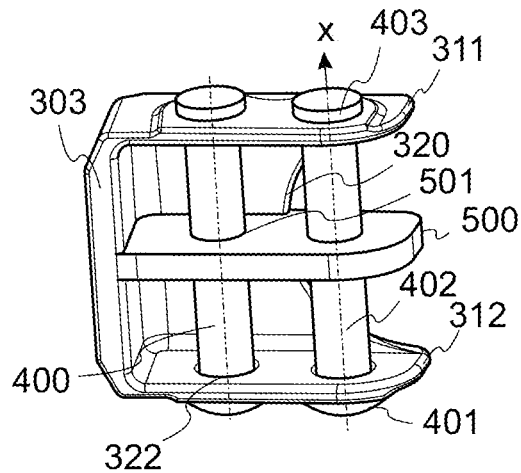
FIG. 5 shows the clip of FIG. 4 from below.
Figure 6:
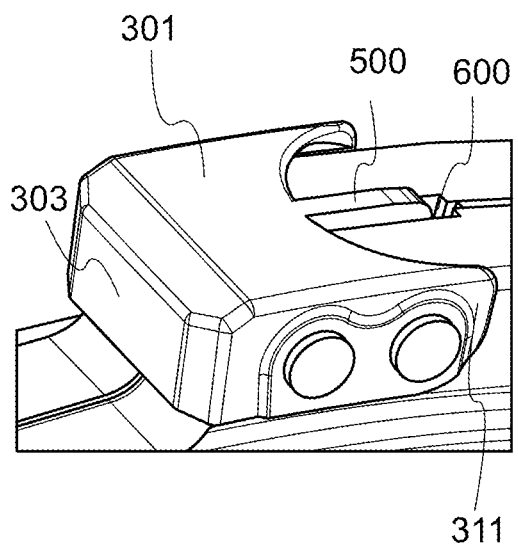
FIG. 6 shows a clip such as shown in FIG. 4 attached to a rotor lug.
Figure 7:
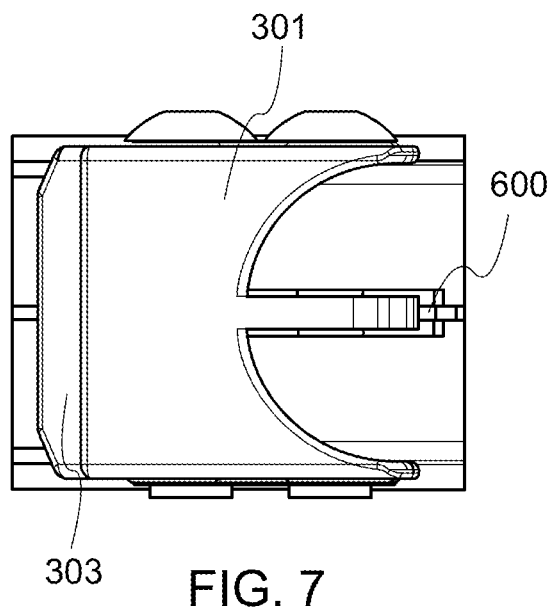
FIG. 7 shows a top view of the assembly of FIG. 6.

FIG. 3 shows a so-called half cap clip 10 which has at least one rivet aperture 12 (in this example, there are two rivet apertures 12). The clip 10 is shaped to fit over the end of a rotor lug 124 and is secured to the lug by means of rivets 14 secured to the side of the lug through the clip apertures 12. As mentioned above, these rivets pass through the width of the rotor lug and can be subjected to bending forces. They can be expensive and difficult to manufacture and install and a hotspot of force can occur around the region of the rivet head 15.

The clip 300 according to the present disclosure, described below with reference to FIGS. 4 to 7, provides an alternative to the half-cap clip described above for securing the clip to the lug, which allows for improved stress distribution, less risk of damage to the carbon of the brake and less risk of bending of the rivet(s), particularly when used on relatively wide rotor lugs where the rivet needs to be long.

The clip 300 according to the disclosure is shaped as a cap to fit over the end of a rotor lug in a manner similar to the conventional clip described above. As with the conventional clip, the clip has a substantially flat planar, top portion 301 that extends in a first plane, a first side 311 and an opposite, second side 312 spaced from the first side by the top surface, and an end portion 303 that extends in a second plane from the top portion. The top portion may be square or rectangular or may be provided with a curved edge 330 as shown in the Figs. The top portion 301, the first and second sides 311, 312, and the end portion 303 each have an inner surface and an outer surface, and the inner surfaces of the top portion, the sides and the end portion together define a recess 320 to receive an end of a lug onto which the clip is mounted, in use. Transitions between the top portion 301, the end portion 303, and/or the sides 311, 312 may include sloped or rounded bends or corners 304, 305. Alternatively, the corners may be sharp. The shape of the clip is such that the end portion 303 lies flat against the end of the lug 124 so that a normal force is transferred through the flat surfaces. Each of the first and second sides 311, 312 is provided with an aperture 322 that, when mounted on the end of the lug 124, aligns with a passage (not shown) through the lug such that a rivet 400 can be passed through the aperture 322 in the first side 311 of the clip, the passage through the lug and out through the aperture 322 in the second side 312 of the clip to secure the clip 300 to the lug 124 when mounted thereon, in use. Whilst it is possible to only use a single rivet 400, additional security and better force distribution (and therefore less stress on the rivet) can be provided by using two rivets as shown in this example, in which case, each side has two apertures and the lug has two passages. More than two rivets could, in theory, also be used if space provides. These features are all similar to those of the clip described in relation to FIG. 3, above.

The rivet(s) has/have a rivet head 401 and a rivet body 402 extending from the head along a rivet axis X. The size of the aperture 322 is such as to allow passage of the rivet body therethrough but is smaller than the rivet head such that the rivet head stops against the side at the aperture and cannot pass through the aperture. The length of the rivet is such that when the rivet is fully inserted, the head abuts against one of the clip sides at the outer surface of the side, the rivet body spans the recess 320 and the other end 403 of the rivet opposite the head 401 protrudes from the aperture in the other side beyond the outer surface of the other side. Preferably (but not necessarily) the end 403 protrudes past the outer surface of the other side by about the same distance as the rivet head protrudes from the first side. A cap or fastener or other finish may be provided on the protruding end 403 to prevent the rivet being withdrawn back through the passage inadvertently. To replace the clip, however, this can be removed so that the rivet(s) can be withdrawn and the clip can be disassembled. Seals and/or washers may be provided between the rivet head and the side of the clip.

In addition to the two clip sides 311, 312 that define the sides of the recess 320, the clip of the present disclosure also has a reinforcement member 500 that extends from the inner surface of the end portion 303 along the recess 320. The reinforcement member 500 extends substantially parallel to and between the first and second sides 311, 312. In the example shown, the reinforcement member 500 extends from around the middle of the end portion 303 (defined with respect of the length between the two sides 311, 312), but the reinforcement member could, if desired, be spaced closer to the first side or closer to the second side. The reinforcement member 500 also has one or more apertures 501 that align with the apertures 322 in the sides 311, 312. The number of apertures in the reinforcement member should match the number of apertures in the sides (or could, in theory be more if there is a need to provide redundant apertures for e.g. manufacturing reasons) and thus will also match the number of rivets used. The width and length of the reinforcement member is selected such that it will fit into a slot 600 in the end of the lug.

To mount the clip 300 to the lug 124, the clip is positioned over the end of the lug such that the top portion 301 rests against the top of the lug and the end portion 303 abuts against the end face of the lug. The reinforcement member 500 will locate in the slot 600 in the lug. The sides 311, 312 will rest against or be closely adjacent the sides of the lug. The aperture or apertures are aligned with the passage/passages through the lug. The, or each, rivet is then inserted through the aperture 322 in the first side, through the passage through the lug and the aperture 501 in the reinforcing member 500 and out through the aperture 322 in the second side 312 until the rivet head abuts against the first side. The other end of the rivet is then fastened or secured and the clip is held in position.

The reinforcement member 500 adds further support to the rivets as they pass through the lug to reduce or prevent bending of the rivets. This is particularly important where the distance the rivet has to extend through the lug is great because longer rivets may be subjected to bending in extreme conditions and this reinforcement member mitigates this problem.

The clip is therefore small, light, simple and inexpensive to manufacture and assemble and allows for a better resistance to bending of the rivet(s).

The invention claimed is:

1. A clip for a rotor disk of a brake assembly, the clip arranged to fit over an end of a lug of the rotor disk, the clip having two opposing sides and an end portion across the two opposing sides, and a top portion, the top portion, the sides and the end portion each having an inner surface and an outer surface, and the inner surface of the top portion, the sides and the end portion together defining a recess configured to receive the rotor lug, in use, the clip having at least one aperture in each of the sides; the clip further comprising a reinforcement member extending from the inner surface of the end portion internal of the recess, between the two sides.

2. The clip of claim 1, the clip having two apertures in each of the sides.

3. The clip of claim 1, further comprising a rivet configured to pass through the or each aperture in the first side, through a passage in the lug, and out through the or each aperture in the second side.

4. The clip of claim 3, wherein the rivet has a rivet head and a rivet body extending from the rivet head along a rivet axis.

5. The clip of claim 4, wherein the pin head extends radially outwards beyond the extent of the pin body.

6. The clip of claim 3, wherein the rivet body has an end opposite the rivet head, the end configured to receive a cap.

7. The clip of claim 1, wherein the reinforcement member extends from a middle of a length of the end portion as defined between the first and second sides.

8. The clip of claim 1, wherein the reinforcement member extends substantially parallel to and between the first and second sides.

9. A rotor disk of a brake assembly provided with a plurality of rotor lugs around and radially extending from its circumference; and the clip as claimed in claim 1 mounted to each rotor lug.

10. The brake assembly comprising a plurality of rotor disks as claimed in claim 9 and a plurality of stator disks, the stator disks and the rotor disks arranged alternately to form a brake stack.

11. A wheel assembly comprising a wheel having an inner diameter within which is mounted to the brake assembly as claimed in claim 10.

12. The wheel assembly as claimed in claim 11, the wheel having an outer diameter onto which a tire is mounted.

13. The wheel assembly as claimed in claim 11, being the wheel assembly for the landing gear of an aircraft.

14. A method of fitting the clip assembly as claimed in claim 3 to a rotor disk of the brake assembly, the method comprising fitting the clip over an end of a rotor lug of the rotor disk such that the inner surface of the top portion sits on a top of the rotor lug, the inner surface of the end portion fits against a front end of the lug, the sides lie adjacent respective sides of the lug and the reinforcement member fits in a slot defined through the lug and wherein the apertures align with a passage through the lug.

15. The method of claim 14 further comprising providing the rivet through the clip and the lug.

* * * * *